(12) United States Patent
Parmet et al.

(10) Patent No.: US 8,672,542 B2
(45) Date of Patent: Mar. 18, 2014

(54) HIGH RESOLUTION MEASUREMENT OF THERMISTOR THERMOMETRY SIGNALS WITH WIDE DYNAMIC RANGE

(75) Inventors: Darryl I. Parmet, Tampa, FL (US); Michael A. Gilbert, Seminole, FL (US); William Joseph Trinkle, Cambridge, MA (US); Ernest Frank John Graetz, Largo, FL (US)

(73) Assignee: Honeywell International Inc., Morristown, NJ (US)

(*) Notice: Subject to any disclaimer, the term of this patent is extended or adjusted under 35 U.S.C. 154(b) by 966 days.

(21) Appl. No.: 12/788,170

(22) Filed: May 26, 2010

(65) Prior Publication Data

US 2011/0292967 A1 Dec. 1, 2011

(51) Int. Cl.
*G01K 7/00* (2006.01)
(52) U.S. Cl.
USPC .......................................... 374/185
(58) Field of Classification Search
USPC .......................................... 374/185
See application file for complete search history.

(56) References Cited

U.S. PATENT DOCUMENTS

| 4,641,778 | A  | * | 2/1987 | Dodson ................. 236/20 R |
|-----------|----|---|--------|----------------------------------|
| 4,751,496 | A  | * | 6/1988 | Araki et al. .............. 341/131 |
| 5,295,746 | A  |   | 3/1994 | Friauf et al.                    |
| 5,416,481 | A  | * | 5/1995 | Chen ........................ 341/131 |
| 5,862,170 | A  |   | 1/1999 | Britton, Jr. et al.              |
| 6,172,629 | B1 | * | 1/2001 | Fetterman ................. 341/131 |
| 8,197,123 | B2 | * | 6/2012 | Snyder et al. ................. 374/1 |

OTHER PUBLICATIONS

"Dithering in Analog-to-Digital Conversion", "E2V Semiconductors SAS", 2007, Publisher: E2V.

* cited by examiner

*Primary Examiner* — Lisa Caputo
*Assistant Examiner* — Jamel Williams
(74) *Attorney, Agent, or Firm* — Fogg & Powers LLC

(57) ABSTRACT

A thermistor amplifier device comprising a first amplifier and a second amplifier is provided. The first amplifier generates an analog temperature signal output based on a voltage across at least one thermistor. The second amplifier generates an offset voltage input to the first amplifier, wherein the offset voltage is based on maintaining the analog temperature signal within a predefined voltage range. The second amplifier selects the offset voltage corresponding to one of a plurality of range levels, wherein each of the plurality of range levels is associated with a temperature range of the at least one thermistor.

16 Claims, 6 Drawing Sheets

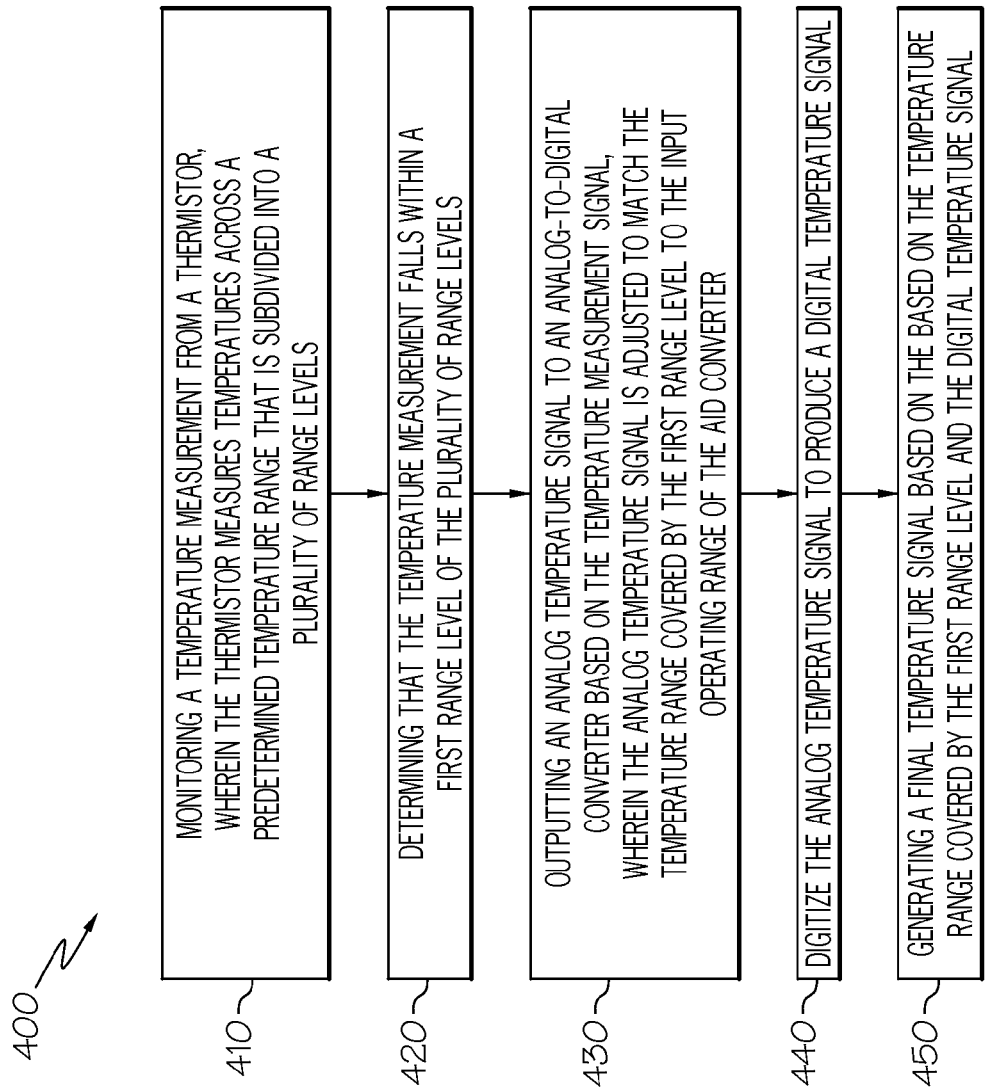

US 8,672,542 B2

HIGH RESOLUTION MEASUREMENT OF THERMISTOR THERMOMETRY SIGNALS WITH WIDE DYNAMIC RANGE

STATEMENT REGARDING FEDERALLY SPONSORED RESEARCH OR DEVELOPMENT

This invention was made with Government support under FA9453-08-C-0162 awarded by AIMU. The Government may have certain rights in the invention.

BACKGROUND

A thermistor is a resistor whose resistivity varies with temperature that is typically used as a temperature sensor. A current is typically driven through the thermistor to generate a voltage monitored by an analog to digital (A/D) converter. The conversion result from the A/D converter is translated to the thermistor resistance and then converted into a temperature result. However, the resolution of the temperature result is limited by the A/D converter. For example, over a temperature range of 10 degrees Celsius (° C.), a 14 bit A/D converter will only provide a resolution of $10/2^{14}$° C. or 600 micro degrees C. Certain applications require a greater degree of resolution than can be provided by A/D converters today.

For the reasons stated above and for other reasons stated below which will become apparent to those skilled in the art upon reading and understanding the specification, there is a need in the art for a thermistor system capable of higher resolution measurements over a wider temperature range and to overcome the inherent integral nonlinearity of the A/D converter.

SUMMARY

One embodiment is directed to a thermistor amplifier device comprising a first amplifier that generates an analog temperature signal output based on a voltage across at least one thermistor and a second amplifier that generates an offset voltage input to the first amplifier, wherein the offset voltage is based on maintaining the analog temperature signal within a predefined voltage range. The second amplifier selects the offset voltage corresponding to one of a plurality of range levels, wherein each of the plurality of range levels is associated with a temperature range of the at least one thermistor.

DRAWINGS

Embodiments of the present invention can be more easily understood and further advantages and uses thereof more readily apparent, when considered in view of the description of the preferred embodiments and the following figures in which:

FIG. 4 is a flowchart of a method of one embodiment of the present invention.

In accordance with common practice, the various described features are not drawn to scale but are drawn to emphasize features relevant to the present invention. Reference characters denote like elements throughout figures and text.

DETAILED DESCRIPTION

Figure 1A:
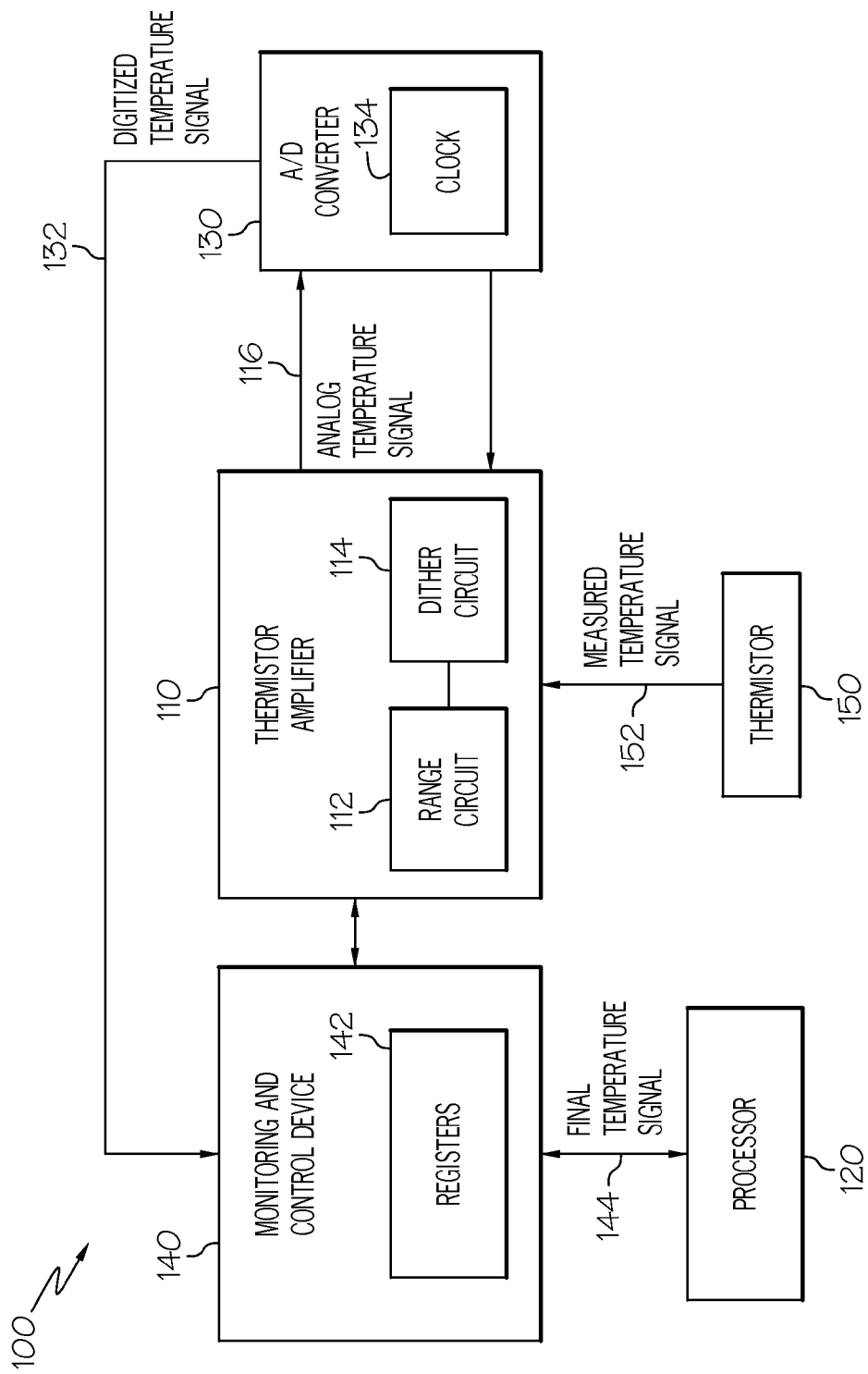
FIG. 1A is a block diagram of one embodiment of the present invention of a system for measuring temperature over a wide dynamic range with a high resolution.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense.

Embodiments of the present invention address the limitations that existing thermistors face when attempting to meet the conflicting requirements of wide dynamic range and high resolution, such as the inherent integral nonlinearity of A/D converters. Embodiments of the present invention provide system and methods to take temperature measurements with high precision and within a broad temperature range. For example, even with high confidence that a temperature measurement sample will fall within a broad temperature range, it may be difficult to estimate where in that temperature range the sample will be. Typical A/D converters, limited by the number of available bits for forming a digital representation of an analog value, do not have sufficient resolution to provide precision over an entire broad temperature range. Embodiments of the present invention scale the A/D converter such that it is suitable for use over a broader temperature range or achieves a higher resolution within the range.

Alternate embodiments further address the effects of integral nonlinearity (INL) error. INL is a deviation between the ideal output of an A/D converter and its actual output level. INL leads to noise and error. Generally speaking, INL error is manifested as a periodic waveform with multiple cycles over the full operating voltage range of the A/D converter. To overcome INL in an A/D converter, alternate embodiments of the present invention subdivide a wide dynamic range of an input signal from a thermistor into a number of smaller ranges, each of which allow for high resolution measurements. A deterministic dither waveform is added to the temperature measurement. The deterministic dither signal sweeps the temperature measurement signal over at least a significant portion of one period of an integral non-linearity error waveform. The samples from one INL error waveform (or from one point on a first INL waveform to a similar point of a second INL waveform) are averaged to smooth out the periodic waveform and reduce the error contribution of the INL error waveform.

Further embodiments of the present invention sum three signals together using a plurality of amplifiers: first, a signal of a temperature being measured (an input temperature signal referred to herein as the temperature measurement signal), second, an offset signal which shifts the temperature measurement into a useable range of the A/D converter (referred to herein as the offset signal), and third, a small periodic deterministic dither signal which sweeps the A/D converter input over a defined range (referred to herein as the dither signal) so that averaging can be performed to eliminate integral non-linearity error and quantization noise. Quantization noise is error due to the difference between an analog value and a quantized digital value. Embodiments of the offset and dither signals are generated using, for example, D/A converters or resistor networks and multiplexers.

The sum of the three signals (referred to herein as the summed signal) is digitized using an A/D converter. The digitized summed signal is then averaged over an integer number of dither waveform periods to minimize the integral non-linearity error. Using the average digitized value and knowledge of the offset signal and dither signal, the resulting temperature measurement can be made with high precision and high resolution. These embodiments can be used with any kind of temperature sensitive device or material where it is desirable to know temperature to a high accuracy.

FIG. 1A is block diagram of one embodiment of a system 100 for high resolution temperature measurements over a wide dynamic range. The system 100 comprises a thermistor amplifier 110, an A/D converter 130, a monitoring and control device 140, a processor 120, and at least one thermistor 150 for making precise temperature measurements over a wide dynamic range (for example, 5° C.). Thermistor 150 outputs a measured temperature signal 152 to the thermistor amplifier 110. The temperature can be of any object, including a sensor in an inertial sensor unit, electrical equipment, or any other system or apparatus where a high resolution temperature is measured.

Thermistor amplifier 110 outputs an analog temperature signal 116 derived from the measured temperature signal 152 and comprises a range circuit 112 and a dither circuit 114. The thermistor amplifier 110 provides analog temperature signal 116 to A/D converter 130. The analog temperature signal 116 is representative of the temperature measured by thermistor 150 and has a voltage within an operating voltage range of A/D converter 130.

A/D converter 130 digitizes analog temperature signal 116 into a digitized temperature signal 132. A/D converter 130 functions over a specific input voltage range (referred to herein as the operating range of A/D converter 130) and converts an analog signal into a digital sample which represents the analog signal as a digital word comprising a predetermined number of bits. Each digital word can be broken down into a most significant bit and a least significant bit. The temperature value represented by the digital word's least significant bit (LSB) determines the temperature resolution that A/D converter 130 can provide. When the digitized temperature signal 132 output of A/D converter 130 is interpreted as a temperature value, the breadth of the temperature range that A/D converter 130 functions over is the LSB multiplied by $2^n$, where n is the number of bits in each digital sample that A/D converter 130 outputs.

In order to effectively expand the operating range of A/D converter 130, thermistor amplifier 110 subdivides the wide dynamic range of measured temperature signal 152 into a number of smaller ranges (referred to herein as range levels). Each range level corresponds to a specific temperature range in the wide dynamic temperature range, as shown in FIG. 1B.

Figure 1B:
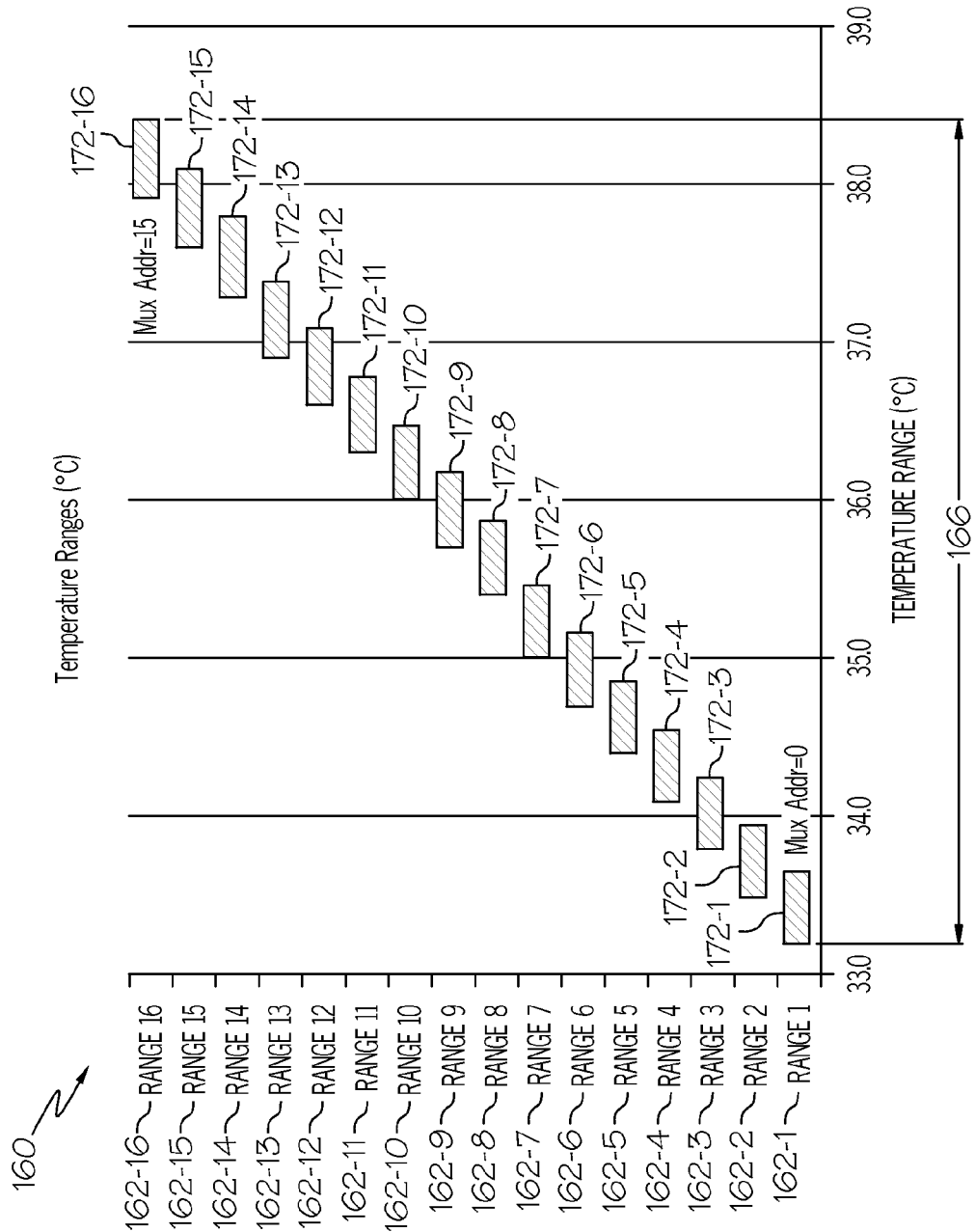
FIG. 1B is a graph illustrating range levels corresponding to temperature ranges of one embodiment of the present invention.

Shown generally at 160 in FIG. 1B is an example of a temperature range illustrated at 166 divided into range levels 1 to 16. That is, the dynamic temperature range is broken into range levels 162-1 through 162-16 (referred to collectively as range levels 162). Wide dynamic temperature range 166 is selected to encompass the entire temperature range that thermistor 150 is expected to cover. Each of the range levels 162 correspond to a specific smaller temperature range within the temperature range 166, shown as temperature ranges 172-1 through 172-16. Temperature ranges 172-1 through 172-16 are referred to collectively as temperature ranges 172. Although FIG. 1B depicts an embodiment with overlapping temperature ranges 172, embodiments of the present invention do not require temperature ranges 172 to overlap and in some embodiments, temperature ranges 172 do not overlap.

The monitoring and control device 140 controls thermistor amplifier 110 to adjust the range level of analog temperature signal 116 so that as temperature varies within any one of the range levels 162, the analog temperature signal 116 will take advantage of the entire operating range of A/D converter 130. In this way, thermistor amplifier 110 permits temperature measurements within each range level 162 to utilize the full resolution available from A/D converter 130, which effectively increases the resolution of the A/D converter 130 or increases the range of the A/D converter 130 without a loss of resolution.

Figure 1C:
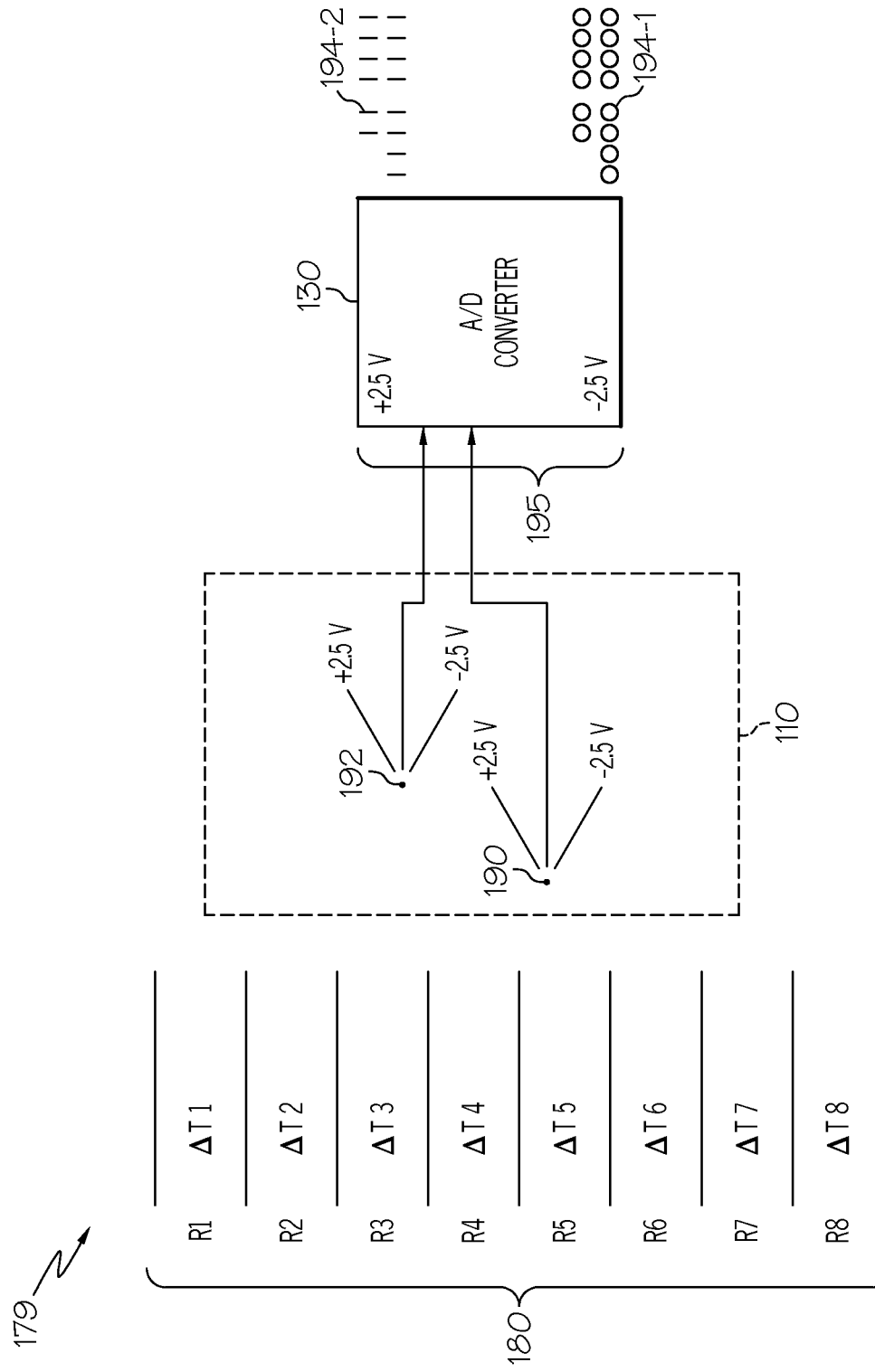
FIG. 1C is a diagram illustrating application range levels of one embodiment of the present invention.

FIG. 1C generally illustrates at 179 the effective increase in resolution of the A/D converter 130. In the example, A/D converter 130 outputs a 14 bit word which can range from a word having a lowest value of all zeros, 00 0000 0000 0000 (shown at 194-1), to a word having the highest value of all ones, 11 1111 1111 1111 (shown at 194-2). Assuming that A/D converter 130 functions over an input voltage range 195 of −2.5 V to +2.5 V, then the lowest value 194-1 corresponds to an input of −2.5 V and the highest value 194-2 corresponds to an input of +2.5 V. Accordingly, thermistor amplifier 110 will output an analog signal of approximately −2.5 V when the measured temperature signal 152 indicates a temperature measurement at a low end of one of the range levels 162, and will output an analog signal of approximately +2.5 V when the measured temperature signal 152 indicates a temperature measurement at a high end of a range level 162. Monitoring and control device 140 scales the voltage of the digitized temperature signal 132 to arrive at a high resolution temperature solution based on the currently active range level 162.

In the example shown in FIG. 1C, the temperature range (shown at 180) of concern the thermistor 150 measures spans 12.8° F. (86.79° F. to 99.59° F.). Assuming that A/D converter 130 is a 14-bit converter, when the LSB of A/D converter 130 word 194-1 is defined to represent a predetermined temperature resolution (for example, 100 µ° F.), A/D converter 130 will have a resulting range of approximately 1.6° F. As 1.6° F. is less than the predetermined temperature range 180 of 12.8° F., dividing up the predetermined temperature range 180 into eight range levels (shown as R1 to R8) each corresponding to 1.6° F. achieves the predetermined temperature resolution of 100 µ° F. over the predetermined temperature range 180. Therefore, the temperature range 180 is broken down into the eight range levels R1 to R8 which each cover a respective temperature range (shown as ΔT1 to ΔT8). In this embodiment, each temperature range ΔT1 to ΔT8 covers 1.6° F.; however in other embodiments, the temperature ranges ΔT1 to ΔT8 do not necessarily cover equal temperature ranges, and subsequently the temperature resolution over those ranges would also vary. Therefore, each range level R1 to R8 recalibrates the output of thermistor amplifier 110 such that the full operating range 195 of A/D is utilized within each range level R1 to R8.

In an exemplary operation of system 100 thermistor 150 takes a first temperature reading 190 of approximately 92.50° F., which falls into the range level R4 corresponding to 91.59 to 93.19° F. Thermistor amplifier 110 recalibrates its output so that a temperature near the bottom of the temperature range ΔT4 (91.59 to 93.19° F.) results in a voltage at the bottom of the operating range 195 of A/D converter 130. Similarly, a temperature at the top of the temperature range ΔT4 is recalibrated to result in a voltage at the top of the operating range 195. That is, when the thermistor amplifier 110 outputs analog temperature signal 116 at the bottom of the operating range 195 (that is, −2.5 V), monitoring and control device 140 or processor 120 interprets the digitized temperature signal as 91.59° F. based on the present selected range level being level R4. Similarly, 93.19° F. corresponds to an analog temperature signal 116 at the top of the operating range 195 (for a signal of +2.5 V) of the A/D converter 130.

Within thermistor amplifier 110, the temperature corresponding to the beginning of the selected level range R4 is removed from the temperature reading 190 in one embodiment. In this example, 91.59° F. (the lower value of range R4) is subtracted from the temperature reading 92.5° F. to arrive at 0.91° F. This value of 0.91° F. is approximately 57.1% of the upper and lower values for level range R4. The thermistor amplifier 110 therefore provides a voltage corresponding to 57.1% of the full input operating range 195 for A/D converter 130, which in this case is approximately +0.357 V. The thermistor amplifier 110 outputs the analog temperature signal 116 of +0.357 V to A/D converter 130. The A/D converter 130 digitizes the analog temperature signal 116 into a 14 bit word, resulting in a digital temperature signal 132 of 10 0100 1001 0010.

Monitoring and control device 140 reads the digital temperature signal 132. Monitoring and control device 140 is coupled to the range circuit 112 and is aware that the presently select range level is range level R4 through its registers 142. Monitoring and control device 140 converts the digital temperature signal 132 of 10 0100 1001 0010 into a temperature value by multiplying the digital temperature signal 132 with the predetermined temperature resolution for the selected range level R4, 0.91° F. in this example. The temperature corresponding to the beginning of the range level R4 (91.59° F.) is added back to 0.91° F. to produce a final temperature signal 144 of 92.5° F. which recreates the temperature being measure by thermistor 150.

In one embodiment, monitoring and control device 140 comprises registers 142 that each store an address that range circuit 112 uses to select a range level 162. Each address corresponds to one of the range levels 162 which in turn corresponds to one of the temperature ranges 172. One embodiment of monitoring and control device 140 comprises 50 registers 142 for 50 different possible temperatures ranges. Embodiments of monitoring and control device 140 comprise a field programmable gate array (FPGA), an application specific integrated processor (ASIC), or any other suitable device.

In one embodiment, monitoring and control device 140 instructs the thermistor amplifier 110 which range levels R1 to R8 to select for processing temperature measurements. In one embodiment, monitoring and control device 140 communicates to the range circuit 112 an address that identifies the presently selected range level 162. In one embodiment, that address is maintained by monitoring and control device 140 within one of the registers 142. In order to keep the analog temperature signal 116 within the operating range 195 of A/D converter 130, once the second measured temperature signal 192 is within a temperature range 172, monitoring and control device 140 provides range circuit 112 with the address corresponding to the range level 162 corresponding to the temperature range 172. Range circuit 112 selects the range level 162, which shifts the voltage of the analog temperature signal 116 into the operating range of A/D converter 130. In another embodiment, for example, range level 162-7 is selected when the measured temperature signal 192 reaches a predetermined upper threshold temperature for the temperature range 162-6, which is a lower temperature than the highest temperature of the temperature range 162-6. In an alternative embodiment, instead of changing range levels 162 based on predetermined upper and lower temperatures thresholds for each temperature range 172, range levels 162 are changed based on an upper and lower voltage threshold of A/D converter 130.

In one embodiment, when monitoring and control device 140 reads that the analog temperature signal 116 is above either the operating range 195 or a predetermined upper threshold within the operating range 195 of A/D converter 130, monitoring and control device 140 sends an address to range circuit 112 that replaces the previous address and thereby select a higher range level 162. When monitoring and control device 140 reads that the analog temperature signal 116 is below either the operating range 195 or a predetermined lower threshold within the operating range 195, monitoring and control device 140 provides an address to range circuit 112 that selects a lower range level 162.

In addition to adjusting the analog temperature signal 116 based on a level range 162, the thermistor amplifier 110 also dithers the analog temperature signal 116. Dither is an intentionally applied form of offset used to reduce quantization and INL errors. The dither circuit 114 adds a predetermined dither waveform (that is, deterministic dither) to the measured temperature signal 152 to reduce the effects of the inherent nonlinearity of A/D converter 130. The dither circuit 114 cycles through a predetermined number of known voltage steps for each measured temperature signal 152, timed with a clock 134, wherein each step changes the voltage of the analog temperature signal 116 by a predetermined dither amount. That is, each dither step corresponds to a predetermined voltage, usually a small voltage change relative to the operating voltage range of A/D converter 130 when dither is used solely to reduce quantization error. With deterministic dither, the average amount of dither-offset is known and can be removed. In an implementation where deterministic dither is used for each averaging period, the dither is easily removed or left as a small fixed offset. In some embodiments where dither is used to minimize INL, the range of the dither is larger than that of the dither used to reduce quantization noise.

The deterministic dither is a predetermined signal added to the analog temperature signal 116 that is selected to average out the INL error of the A/D converter 130. A number of dither samples evenly spaced across at least one of the repeating saw tooth ramps are averaged to reduce INL error. The correction of INL error is improved more when the averaging is spread across more than one INL ramp. The wider the width that is averaged and the more samples taken improve INL error correction, while the required time to perform the sampling and averaging is increased and the usable range of the A/D converter 130 may be decreased.

Averaging a set of dithered signals effectively adds more bits of resolution to the A/D converter 130, where the resolution increases by the square root of the number of samples used. Thus dithering with averaging 256 samples gives 16 times more resolution, the equivalent of 4 more bits. For example, a 14 bit A/D converter 130 is effectively turned into an 18 bit A/D converter, although it takes 256 times longer to complete the operation. Further, adding the offset voltage based on range level also effectively adds more significant bits to the resolution of the A/D converter 130. For example, having 16 range levels effectively adds 4 bits to the A/D converter 130, raising the now effective 18 bit A/D converter 130 to a 22 bit A/D converter 130. To get an increase of 16 in the operating range requires at a minimum of 16 non-overlapping steps. However, the same increase in effective resolution is achieved, for example, with 32 steps having a 50% overlap.

Clock 134 is used to sample thermistor 150 and is inputted into the dither circuit 114. In one embodiment of the system 100, the dither circuit 114 selects a dither level for each clock pulse in a consecutive cycle. For example, at a first clock pulse, the dither circuit 114 selects dither level 1 among 8 dither levels, and a first sample is taken. At a second clock pulse, the dither circuit 114 selects dither level 2, increasing the voltage of the analog temperature signal 116 by the predetermined amount, and a second sample is taken. At the $8^{th}$ clock pulse, the dither circuit 114 selects dither level 8, and an eighth sample is taken. At the $9^{th}$ clock pulse, the dither circuit 114 resets and selects dither level 1, and a ninth sample is taken.

In one embodiment of the system 100, monitoring and control device 140 averages the samples across one complete set of dither levels, regardless of which dither level the dither circuit 114 is at when the samples are taken (that is, samples from dither level n to dither level n−1 are averaged). Thus, the final temperature signal 144 is an averaged value of several digitized summed signals 132 in order to reduce INL error and filter out white and quantization noise. In addition to this and controlling the range level, embodiments of monitoring and control device 140 convert the digitized temperature signal 132 to a final temperature signal 144 based on the range level 162. Some embodiments of monitoring and control device 140 forward data to the processor 120, which performs functions on the data (such as averaging, scaling the data based on the range level, etc.). Some embodiments of the processor 120 have a higher resolution than the A/D converter 130 to increase the effective resolution of the A/D converter 130.

Figure 2:
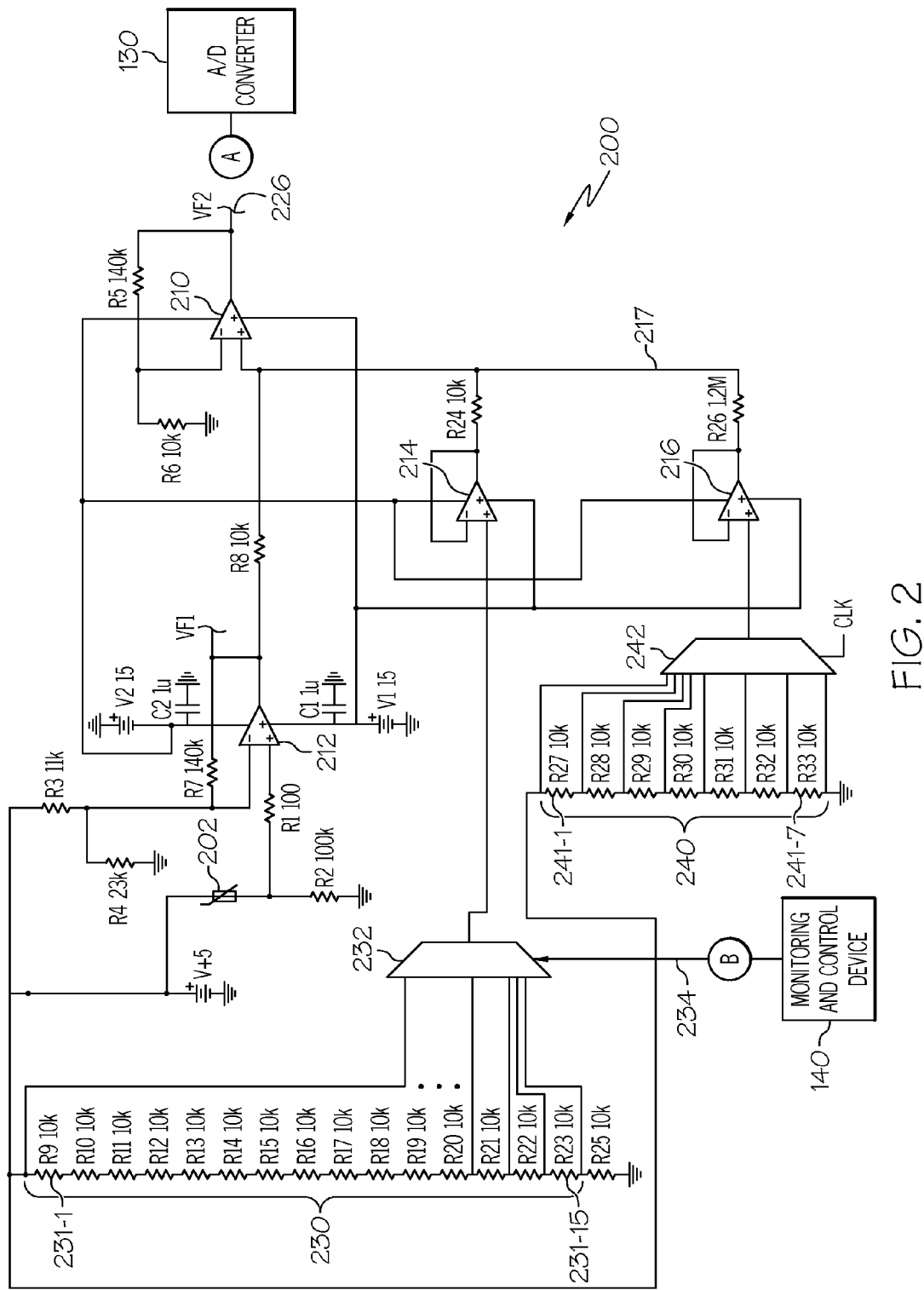
FIG. 2 is a circuit diagram of one embodiment of the present invention.

FIG. 2 is a circuit diagram of one embodiment of a thermistor amplifier 200, such as, for example, the thermistor amplifier 110 discussed with respect to FIG. 1A. Thermistor amplifier 200 comprises at least one thermistor 202, an operating range selector resistor ladder 230, a dither resister ladder 240, and four amplifier components 210, 212, 214, and 216. In some embodiments, the amplifiers 210, 212, 214, and 216 described herein are operational amplifiers. The thermistor amplifier 200 couples to an A/D converter at point A and to a monitoring and control device at point B, such as A/D converter 130 and monitoring and control device 140 of FIG. 1A.

As resistance of thermistor 202 varies with temperature, the voltage across the thermistor 202 also varies as a function of temperature. A non-inverting input of amplifier 212 senses the varying voltage signal from the thermistor 202. Amplifier 212 amplifies the voltage generated by the thermistor 202 to make its output voltage swing across a voltage range corresponding to a wide dynamic temperature range of the device which the thermistor 202 is measuring. For example, in one embodiment where the temperature of the device being measured is held to a nominal temperature plus or minus approximately 5° F. (corresponding to the wide dynamic range), the output voltage of the amplifier 212 ranges from about −5 V at the minimum temperature to about 0 V at the maximum temperature of the wide dynamic range. The voltage produced by the amplifier 212 is provided to the non-inverting input of the amplifier 210.

Amplifier 214 is coupled to the operating range selector resistor ladder 230 and sets the range level for the thermistor amplifier 200. Amplifier 214 receives a voltage offset signal from the range ladder 230 that indicates which temperature range the thermisor 202 is measuring. The offset signal produced by the amplifier 214 is provided to the non-inverting input of the amplifier 210.

In the particular embodiment shown in FIG. 2, range ladder 230 comprises a plurality of resistors that each correspond to a range level. Each resistor in the range ladder 230 is coupled to an input of a range multiplexer 232. In operation, range multiplexer 232 selects one of the possible offset voltages from the range ladder 230 that will provide the offset voltage signal to amplifier 214. For example, in one embodiment, monitoring and control device 140 provides an address to the range multiplexer 232 based on the output of A/D converter 130 (for example, the digitized temperature signal 132). Range multiplexer 232 defines an address for each resister node that it is coupled to. Range multiplexer 232 changes the selected offset voltage as needed to keep an analog temperature signal 226 within the operating range of A/D converter 130. When monitoring and control device 140 detects that the digitized temperature signal 132 is getting close to either end of the operating range of A/D converter 130, it provides the range multiplexer 232 with an address corresponding to the next range level to use via input 234.

In one embodiment of the range ladder 230, all of the resistors have approximately the same resistance. In another embodiment, all of the resistors are made of the same material. One embodiment of the multiplexer 232 is an analog multiplexer. In other embodiments of the thermistor amplifier 200, other forms of variable resistance are used to provide the range level functionality.

Amplifier 216 is coupled to the dither resistor ladder 240 through a dither multiplexer 242. Dither ladder 240 comprises a plurality of resistors, wherein each resistor corresponds to a deterministic step on an INL ramp. Integral non-linearity is a periodic waveform with multiple cycles over the full range of an A/D converter that shifts the actual output level of the A/D converter from its ideal output. Amplifier 216 produces a dither voltage signal (shown generally at 217) based on which node in the dither ladder 240 is selected to reduce the INL error effects of A/D converter 130. The dither signal is also provided to a non-inverting input of amplifier 210. Thus, in time with a clock that runs A/D converter 130, the thermistor amplifier 200 samples temperature from the thermistor 202, dithering the signal for each sample.

Figure 3:
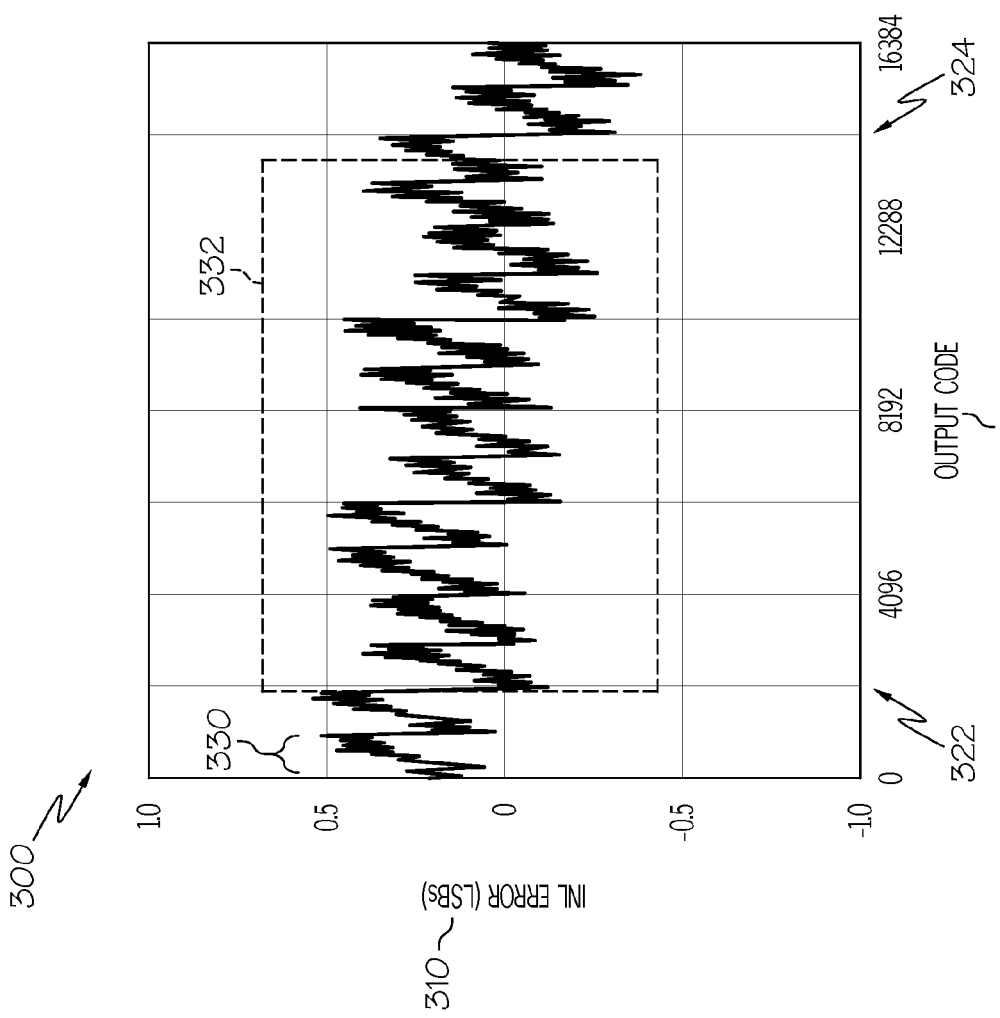
FIG. 3 is a graph illustrating integral nonlinearity versus output code for one embodiment of the present invention.

FIG. 3 illustrates INL ramps as the input voltage traverses across the operating range of the A/D converter. As illustrated in FIG. 3, a dither signal is a small periodic signal that sweeps the A/D converter input over a defined range so that averaging can be performed to reduce integral non-linearity error. This repetition interval is an approximate constant bit interval and is referred to as an INL ramp. The graph shown generally at 300 illustrates integral nonlinearity 310 versus output code 320 for one embodiment of an A/D converter. This example assumes that the A/D converter is a 14 bit converter with an operating range of −2.5 V to +2.5 V. Point 322 corresponds to −1.875 V and point 324 corresponds to 1.875 V. The INL in this exemplary A/D converter generally repeats over an approximate 1024 ($2^{10}$) bit interval, corresponding to 312 mV. To remove INL of an A/D converter with INL as shown in FIG. 3 with a width of approximately 1023 bits, the dither steps are spread evenly across the 1023 LSBs.

Each bit in the A/D converter is not necessarily weighted the same along its operating range. To keep the A/D converter in the most linear portion of its operating range, the input voltage to the A/D converter (that is, analog temperature signal 226) is shifted by the range offset circuit to keep it within a specified range. For example, the analog temperature signal 226 is kept between −1.875 V (point 322) and 1.875 V (point 324), to keep it within range 332, once the temperature of the device being measured is stable. This eliminates the first and last two INL ramps. In this embodiment, when the voltage of the A/D converter is outside point 322 or point 324, the range level is changed to the next lowest or highest, respectively. Switching range levels early in this manner with an overlap between range levels reduces the possibility that the A/D converter bounces between range levels.

Returning to FIG. 2, to reduce INL error, the amplifier voltage produced by amplifier 216 varies the analog temperature signal 226 to the A/D converter 130 over the equivalent of one INL period in several steps (for example, over 312 mV in 8 or 16 steps). Analog temperature signal 116 is shifted by a small voltage amount for each sample taken by the A/D converter in order to have samples that can be averaged to reduce INL error. Monitoring and control device 140 averages the resultant digitized temperature signals 132 for each of the steps over an INL ramp. In one embodiment, the pattern of the dither represents a sawtooth (as shown in FIG. 3) which is generated by stepping dither multiplexer 242 through resistors 241-1 through 241-7 (referred to collectively as resisters 241), where each node between resistors 241 corresponds to a dither step. The weight of the bits throughout a dither ramp is off by some error (for example, zero to half a bit). Averaging is performed regardless of whether the A/D converter input voltage starts at the bottom of an INL ramp or elsewhere in the INL ramp to reduce this error. Monitoring and control device 140 converts the averaged digitized signal into a high precision final temperature signal 144 based on the range level and dither level. In other embodiments, the processor 120 averages the dithered digitized summed signals 132 and converts the average into a high precision final temperature based on the range level.

Stepping through the dither ladder 240 permits the amplifier 210 to act as if it is at the minimum input voltage of A/D converter 130 at one of the 0 LSB points due to averaging of the dither signals over an INL ramp. When the dither multiplexer 242 selects zero dither at the minimum value of the dither ladder 240, the dither multiplexer 242 selects the node above the resistor 241-1, the input voltage to A/D converter 130 is at a relative minimum. When the dither multiplexer 242 selects the next resistor on the dither ladder 240 with m resistors, the input voltage to the A/D converter moves up $1/m^{th}$ the way up the INL ramp. The dither multiplexer 242 steps through the m resistors (m steps from the bottom to the top of each INL ramp). The processor 120 averages the m readings, resulting in zero offset, and the final value will be in the middle of the INL ramp. In one embodiment, the dither multiplexer 242 steps through the m resistors for each temperature reading. This reduces the raw bit error from integral nonlinearity and improves the overall functionality of the A/D converter. The time duration the thermistor amplifier 200 has to step through all dither levels depends on the time constant of the temperature being read. In embodiments with a varying time constant for the temperature, the dither level for each INL ramp is varied. In one embodiment, a distinct averaging is performed for each INL ramp. In other embodiments, a running average is kept through different INL ramps.

Providing the temperature measurement, the offset, and the dither signals from respective amplifiers 212, 214, and 216, to the non-inverting input of amplifier 210 effectively sums the signals at that input. Amplifier 210 amplifies the summed signals to produce an analog signal within the operating range of A/D converter 130. For example, assume that one range level covers a nominal 0.718° F. span. Beginning at the lower end of the range level, amplifier 210 produces an output voltage of approximately −2.5 volts, which is the lower operating range of A/D converter 130. As the thermistor 202 senses an increase in temperature, the output from amplifier 210 increases. As the sensed temperature increases 0.718 degrees, the output of amplifier 210 increases to +2.5 volts. At this point, monitor and control device 140 will switch range level multiplexer 232 to the next range level. The voltage output from multiplexer 232 to amplifier 214 alters the offset voltage so that amplifier 210 produces an output voltage of approximately −2.5 volts, and operation will thus continue. In this way, amplifier 214 adjusts the offset so that over each range level, the amplifier 212 takes advantage of the resolution provided by the entire operating range of A/D converter 130 for measuring precise temperatures within each range level. The summed signal is provided to the A/D converter (such as A/D converter 130) whereupon it is digitized.

Other embodiments of the thermistor amplifier 200 comprise more than one thermistor 202. In one such embodiment, two or more thermistors are attached to various points of a system to be measured. These thermistors are not connected to each other and individual measurements are taken using analog multiplexers to select and measure each thermistor sequentially. In one embodiment, the thermistor amplifier 200 functions over a temperature range of approximately 33 to 39° C. Other embodiments of a thermistor amplifier will be functional over a different temperature range. In yet another embodiment, the A/D converter makes the range level and dither level selections.

FIG. 4 is a flowchart of one embodiment of a method 400 of making a precise temperature measurement with reduced INL error. The method 400 begins with monitoring a temperature measurement from a thermistor, wherein the thermistor measures temperatures across a predetermined temperature range that is subdivided into a plurality of range levels (block 410). For example, monitoring and control device 140 monitors the measured temperature reading 152 output by thermistor 150.

The method 400 determines that the temperature measurement falls within a first range level of the plurality of range levels (block 420). For example, the monitoring and control device 140 compares the voltage of the measured temperature reading 152 to the voltage levels of the range levels 162. Through this comparison, the monitoring and control device 140 detects the temperature range that the measured temperature reading falls into.

Method 400 further comprises outputting an analog temperature signal to an analog-to-digital converter based on the temperature measurement signal, wherein the analog temperature signal is adjusted to match the temperature range covered by the first range level with the input operating range of the A/D converter (block 430). In one implementation of method 400, the monitoring and control device 140 sends an address stored in a register 142 that is used to select the range level 162 to the range circuit 112. Based on this address, the range circuit 112 selects a range level 162, which adjusts the offset voltage provided to amplifier 210. Based on this offset voltage, thermistor 110 provides the analog temperature signal 116 to the A/D converter 130, where the voltage of the analog temperature signal 116 is within the operating range 195 of the A/D converter 130.

Method 400 further comprises digitizing the analog temperature signal to produce a digital temperature signal (block 440). For example, A/D converter 130 digitizes the analog temperature signal 116 to produce the digitized temperature signal 132. A final digital temperature signal is generated based on the temperature range covered by the first range level and the digital temperature signal (block 450). For example, the processor 120 generates the final temperature signal 144 based on the selected range level 162 and the digitized temperature signal 132.

In one embodiment of method 400, the output voltage is monitored in order to know when it is getting close to either extremity of the A/D converter operating range. When the output voltage goes beyond an upper or lower voltage threshold level, a new range level is selected. For example, the range multiplexer 232 selects the next lowest range level if the output voltage is below a predetermined lower voltage threshold level of the A/D converter 130 or the next highest range level if the output signal is above a predetermined upper voltage threshold level. In another embodiment, when the analog temperature signal is within the operating range of the A/D converter, that current range level is maintained. The temperature signal is amplified based on a selected range level. As the temperature of a system moves up or down, the range level is changed such that the thermistor amplifier is always operating within an operating range of an A/D converter.

Embodiments of the method 400 further comprise stepping though an integral nonlinearity ramp by consecutively stepping through a plurality of dither levels. The outputted dithered signals corresponding to the INL ramp are averaged. For example, monitoring and control device 140 averages the dither signals from one INL ramp into an averaged digitized temperature signal. This signal is resolved into the final temperature signal based on the dither average in addition to the selected range level.

Several means are available to implement the systems and methods of the current invention as discussed in this specification. These means include, but are not limited to, digital computer systems, microprocessors, general purpose computers, programmable controllers and field programmable gate arrays (FPGAs). For example, in one embodiment, monitoring and control device 140 is implemented by an FPGA or an ASIC, or an embedded processor. Therefore other embodiments of the present invention are program instructions resident on computer readable media which when implemented by such means enable them to implement embodiments of the present invention. Computer readable media or storage media includes any form of a physical computer memory device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL). Combinations of the above are also included within the scope of computer readable media. Furthermore, AC power, DC power, or combinations thereof can be implemented in embodiments of the present invention.

A number of embodiments of the invention defined by the following claims have been described. Nevertheless, it will be understood that various modifications to the described embodiments may be made without departing from the spirit and scope of the claimed invention. Features and aspects of particular embodiments described herein can be combined with or replace features and aspects of other embodiments. Accordingly, other embodiments are within the scope of the following claims.

What is claimed is:

1. A thermistor amplifier device, comprising:
a first amplifier that generates an analog temperature signal output based on a voltage across at least one thermistor;
a second amplifier that generates an offset voltage input to the first amplifier, wherein the offset voltage is based on maintaining the analog temperature signal within a predefined voltage range; and
a third amplifier configured to dither the analog temperature signal;
wherein the second amplifier selects the offset voltage corresponding to one of a plurality of range levels, wherein each of the plurality of range levels is associated with a temperature range of the at least one thermistor.

2. The device of claim 1, further comprising:
a monitoring and control device, wherein the second amplifier selects the offset voltage corresponding to one of a plurality of range levels based on a range level selected by the monitoring and control device.

3. The device of claim 2, further comprising:
an analog to digital converter coupled to the first amplifier, wherein the analog to digital converter generates a digitized temperature signal from the analog temperature signal.

4. The device of claim 3, wherein the monitoring and control device receives the digitized temperature signal and selects the range level based on the digitized temperature signal.

5. The device of claim 3, wherein the monitoring and control device outputs a final temperature signal based on the value of the digitized temperature signal and a temperature range corresponding to a currently selected range level.

6. The device of claim 1, wherein the third amplifier applies a dithering signal that is summed with the analog temperature signal into a dithered analog signal.

7. The device of claim 6, wherein the dithering signal has a predetermined voltage selected for decreasing the integral non-linearity of the A/D converter.

8. The device of claim 7, wherein the dithering signal is a periodic signal wherein the predetermined voltage is added to the analog temperature signal over the period; and
wherein the monitoring and control device averages the digitized temperature signal over at least one period.

9. A system for measuring temperature, comprising:
a thermistor amplifier that outputs an analog temperature signal corresponding to a temperature reading;
an A/D converter coupled to the thermistor amplifier, wherein the A/D converter comprises an operating voltage range and digitizes the analog temperature signal; and
a monitoring and control device coupled to the thermistor amplifier, wherein the monitoring and control device monitors a range level of the thermistor amplifier, wherein the range level is correlated to a temperature range, and instructs the thermistor amplifier to change the range level based on the temperature reading such that the voltage of the analog temperature signal is within the operating voltage range;
wherein the thermistor amplifier comprises:
a first amplifier that generates the analog temperature signal output based on the temperature reading, wherein the temperature reading is a reading of a voltage across at least one thermistor;
a second amplifier that generates an offset voltage input to the first amplifier, wherein the offset voltage depends on the range level; and
a third amplifier configured to provide the first amplifier with the dither signal.

10. The system of claim 9, wherein the monitoring and control device is further configured to derive a final temperature signal based on the digitized temperature signal and the range level.

11. The system of claim 9, wherein the dither signal has a predetermined voltage; and
wherein the dither signal is a periodic signal wherein the predetermined voltage is added to the analog temperature signal over the period; and
wherein the monitoring and control device averages the digitized temperature signal over at least one period.

12. The system of claim 9, wherein the monitoring and control device is further configured to average the digitized temperature signal over the cycle.

13. The system of claim 9, further comprising:
wherein the second amplifier generates a higher offset voltage when the voltage of the analog temperature signal is greater than a predetermined upper voltage threshold level of the operating voltage range; and
wherein the second amplifier generates a lower offset voltage when the voltage of the analog temperature signal is less than a predetermined lower voltage threshold level of the operating voltage range.

14. The system of claim 9, wherein the monitoring and control device sets a least significant bit of the A/D converter to a predetermined temperature resolution.

15. The system of claim 9, further comprising:
an electronic device in proximity to at least one thermistor, wherein the at least one thermistor takes the temperature reading of the electronic device;
wherein the A/D converter comprises a periodic integral nonlinearity that comprises a plurality of ramps;
wherein the thermistor amplifier comprises:
a first amplifier coupled to the at least one thermistor, wherein the amplifier resistor amplifies the temperature reading based on the operating voltage range into a temperature measurement signal and provides the temperature measurement signal to a second amplifier;
a third amplifier configured to provide the second amplifier with an offset signal based on a selected range level, wherein the voltage of a signal at the bottom of the selected range level corresponds to a minimum word the A/D converter outputs;
a fourth amplifier configured to provide the second amplifier with a dither signal based on a selected dither level from a plurality of dither levels, wherein the selected dither level corresponds to a point on one of the plurality of ramps; and
wherein the second amplifier sums the temperature measurement signal, the offset signal, and the dither signal into the analog temperature signal; and
wherein the monitoring and control device instructs the fourth amplifier to cycle though the plurality of dither levels for each consecutive temperature reading; and
a processor that averages the digitized temperatures signals over a single cycle of the plurality of dither levels and interpret the average based on the selected range level.

16. A temperature measurement system, comprising:
a thermistor amplifier, comprising:
a first amplifier that generates an analog temperature signal output based on a voltage across a thermistor;
a second amplifier that generates an offset voltage input to the first amplifier, wherein the offset voltage is based on maintaining the analog temperature signal within a predefined voltage range; and
a third amplifier that generates a dither signal that alters the analog temperature signal by a small voltage compared with the predefined voltage range;
wherein the second amplifier selects the offset voltage corresponding to one of a plurality of temperature ranges; and
a monitoring and control device coupled to the thermistor amplifier that instructs the second amplifier to select the offset voltage based on the temperature range that the voltage across the thermistor falls into.

* * * * *